Sept. 20, 1927.

R. SIEGERT 1,643,260

DEVICE FOR DRILLING, FILLING, AND SEALING HOLLOW BODIES

Filed Aug. 17, 1925 6 Sheets-Sheet 1

Inventor.
Richard Siegert
by
H Gaules & Boehm
attorney

Sept. 20, 1927.  
R. SIEGERT  
1,643,260  
DEVICE FOR DRILLING, FILLING, AND SEALING HOLLOW BODIES  
Filed Aug. 17, 1925     6 Sheets-Sheet 2

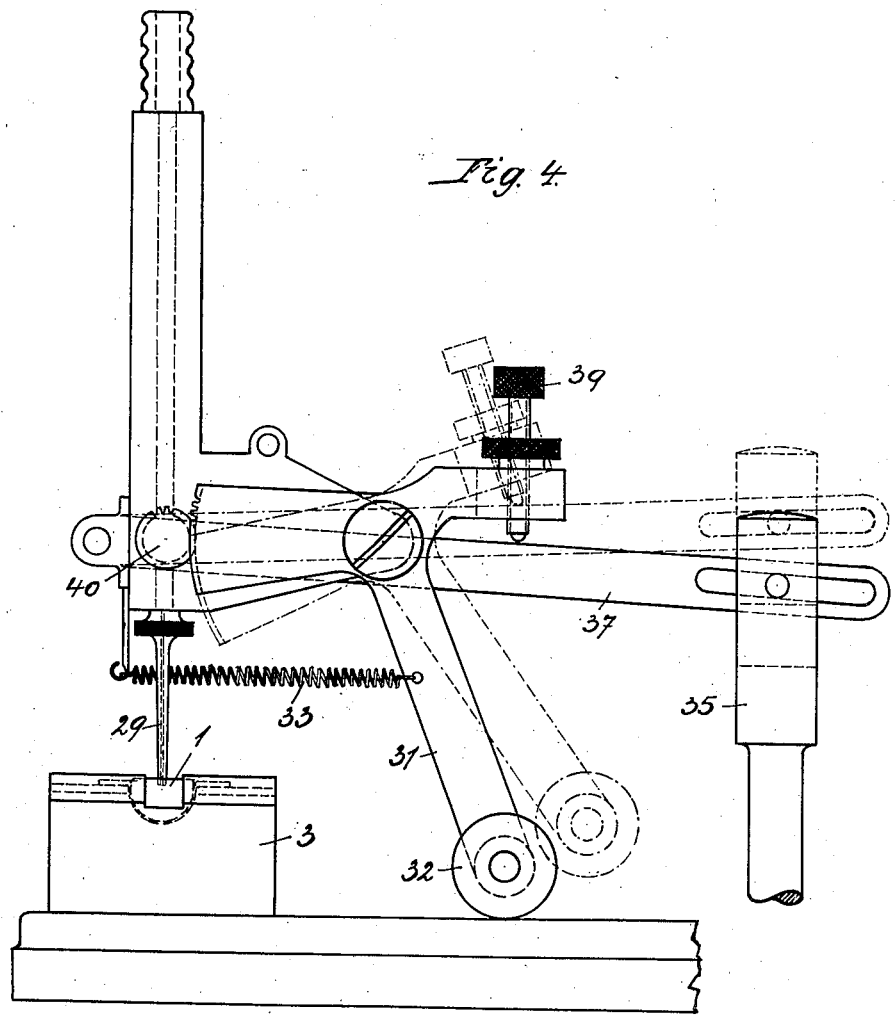

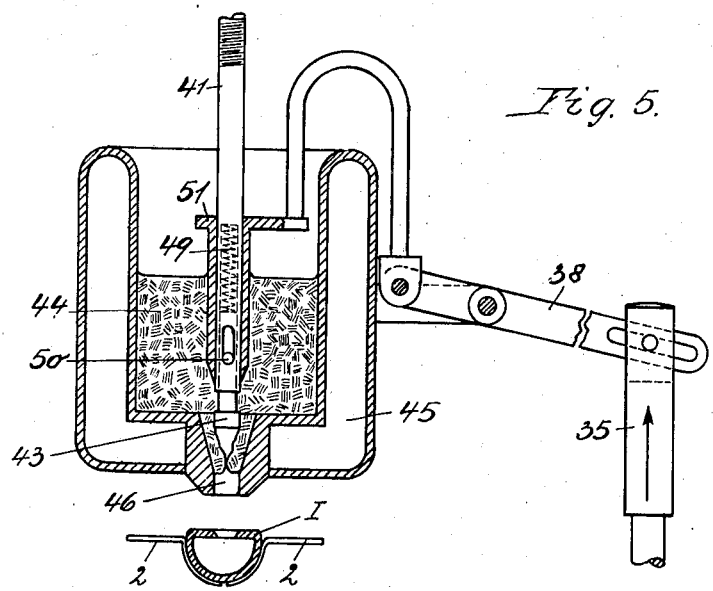
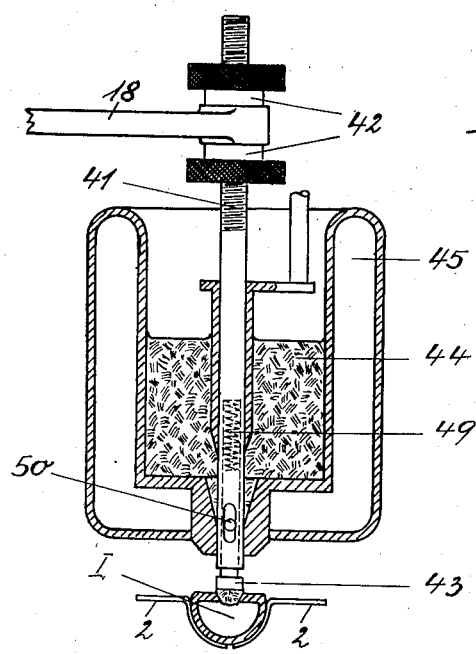

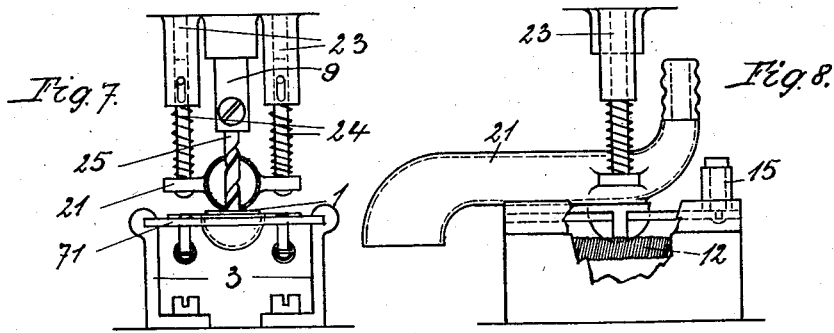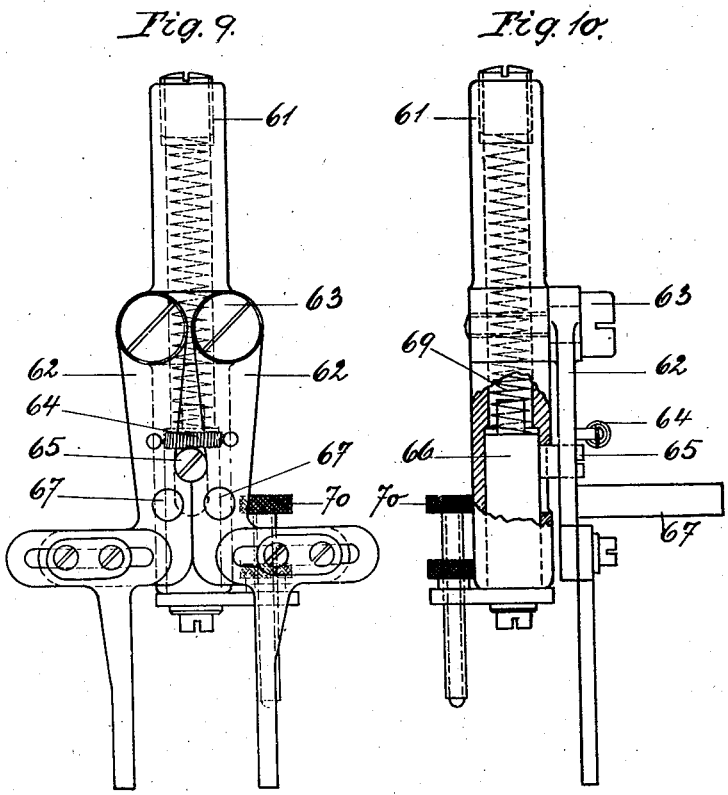

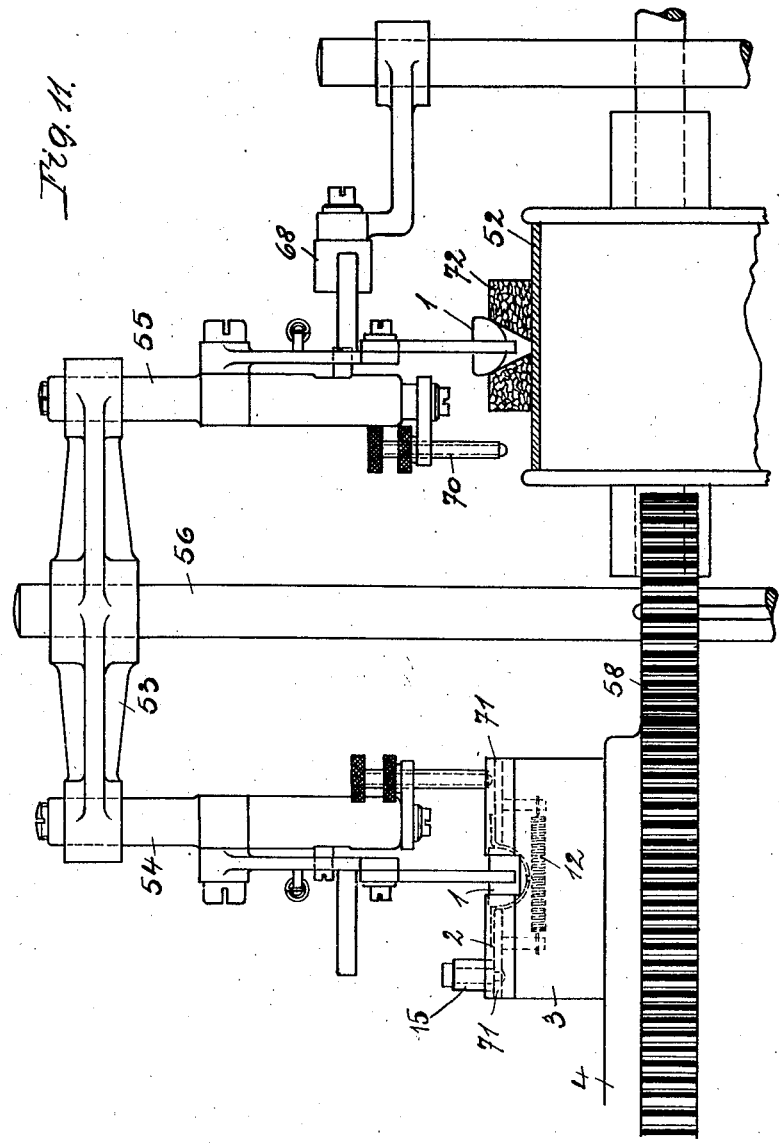

Patented Sept. 20, 1927.

1,643,260

UNITED STATES PATENT OFFICE.

RICHARD SIEGERT, OF KLEIN-DREBNITZ, GERMANY, ASSIGNOR TO ADOLF FRITZ, OF DRESDEN-A., GERMANY.

DEVICE FOR DRILLING, FILLING, AND SEALING HOLLOW BODIES.

Application filed August 17, 1925, Serial No. 50,765, and in Great Britain May 6, 1925.

The object of the present invention is a machine for filling and sealing hollow bodies which may be particularly applied to the manufacture of hollow chocolate bodies. The same device can naturally be applied to other spheres of technics where hollow bodies are first drilled, then filled with a substance and finally sealed. In the present modification the invention is applied to the filling and sealing of hollow chocolate bodies.

The process hitherto in use of filling hollow bodies consisted in drilling the hollow chocolate bodies by hand, filling them by means of a hand-operated squirt and finally sealing them by hand. Aside from lacking uniformity in filling this process has the additional drawback of requiring much time for its application, and the present invention is therefore intended to replace this manual process.

The chief characteristic of the invention lies in the fact that the hollow bodies are guided past a drilling, filling and sealing device in one course of work and by means of one and the same conveying device, and are automatically delivered. The devices mentioned above are secured to a common guiding member and are simultaneously moved up and down at each forward movement of the work pieces. The new machine can be very profitably applied to mass manufacture, and its operation is very clean.

The accompanying drawings illustrate one form of the invention; in these drawings—

Figure 1:
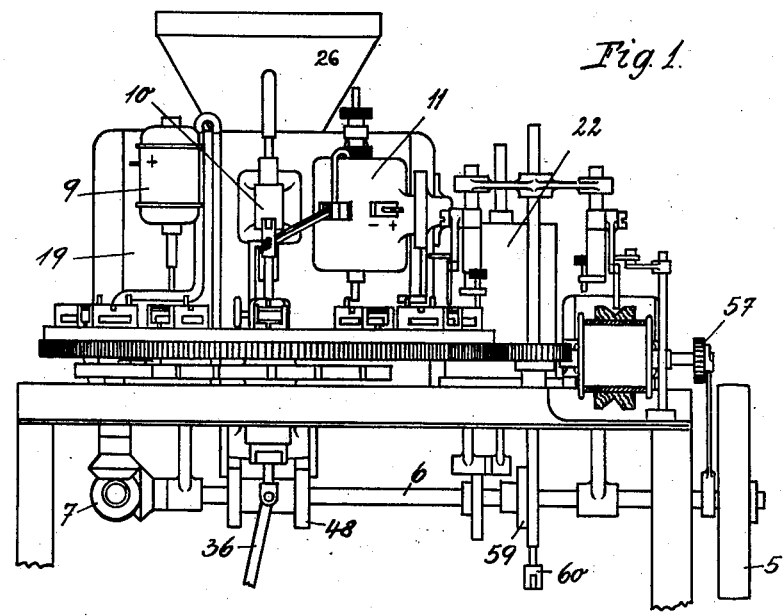
Figure 2:
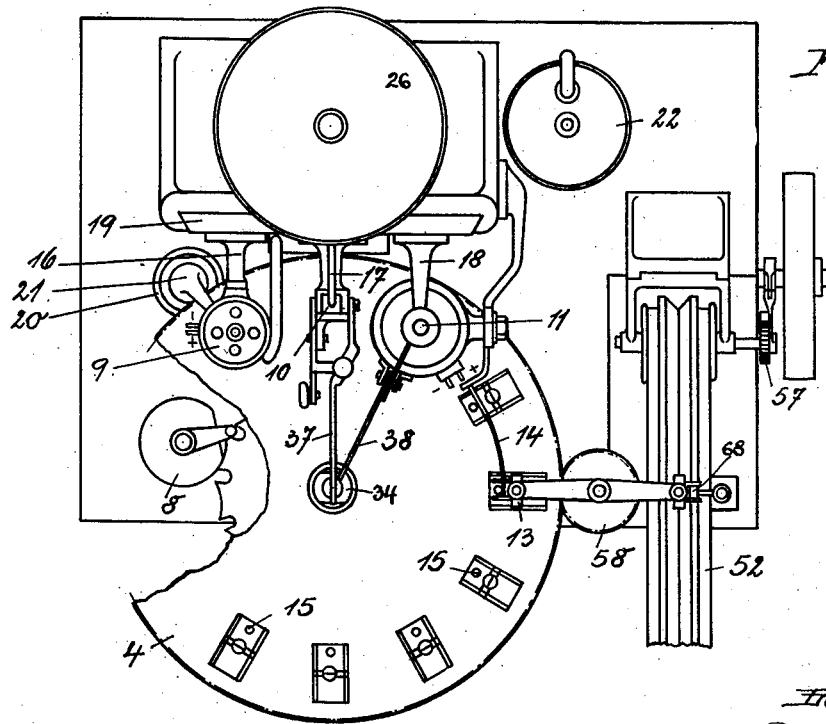
Figure 3:
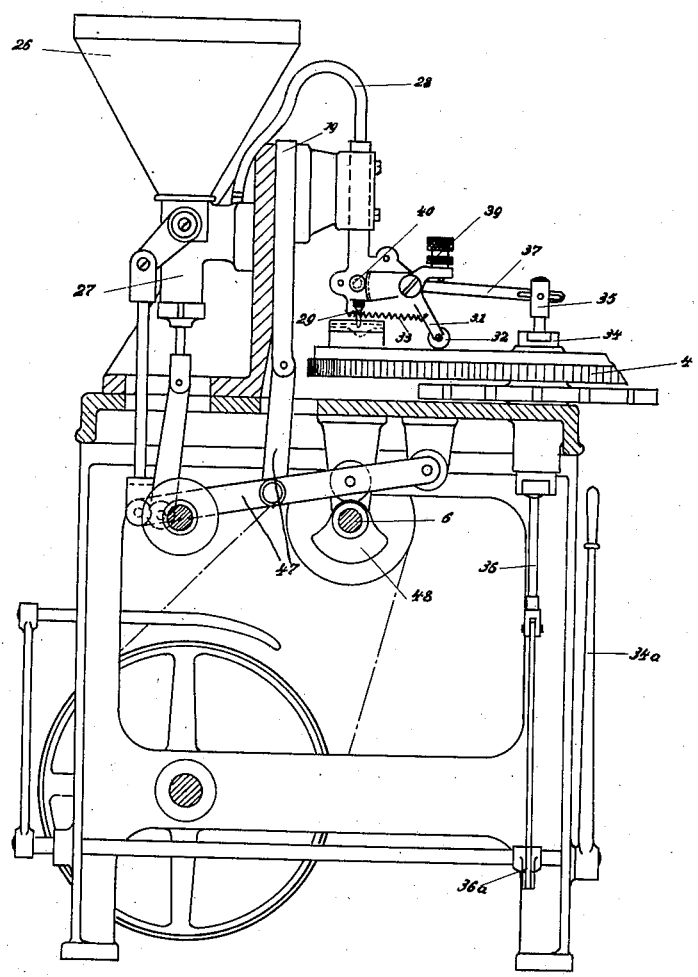

Figure 1 is a front view of the machine;
Fig. 2, a top view of same;
Fig. 3, a sectional side view of the filling device;
Fig. 4, a side view of the filling device with stopping contrivance;
Fig. 5, a sectional view of the sealing device with stopping contrivance and piston in upper position;
Fig. 6, a sectional view of the sealing device with piston in lowest position;
Fig. 7, a front view of the drilling device with casing;
Fig. 8, a side view of the drilling device with casing;
Fig. 9, a front view of the gripper;
Fig. 10, a sectional side view of a gripper;
Fig. 11, the total arrangement of the gripping device with conveyor device.

The hollow bodies 1 are mechanically or by hand placed in holders 2. The holders 2, by means of a support 3, are arranged on a rotating disc 4 which is turned clockwise and intermittently by means of the drive 5, the shaft 6, the bevel wheels 7 and the driving device 8. The holders 2 are attached to the rotating disc 4 so as to be successively led by it past a drilling device 9, a filling device 10, and a sealing device 11. The holders 2 of the hollow bodies 1 consist of two parts and are slidingly attached to the slides in the side walls of the device 3 so as to prevent breaking of the hollow bodies. The slides are guided in slots provided in the walls of the device 3 and held together by springs 12. The sliding arrangement of the holders 2 offers the additional advantage that the clamped hollow bodies 1 are loosened at the discharge station 13 by the stationary crank rod 14 and sliding roll 15, which is secured to the slide of the device 3, so that safe removal of the bodies becomes possible.

The drilling device 9, the filling device 10 and the sealing device 11, by means of the arms 16, 17 and 18, are secured to a common guiding member 19 which in the present modification has been arranged as prismatic slide 19. The drilling machine is driven either by hand or mechanically. The shavings produced during drilling are conveyed to a receptacle 20 by means of a blowing device as shown in Figs. 7 and 8. To ensure proper functioning, the device has been constructed so as to provide an elastic casing 21 by means of which, in cooperation with an air current produced by a pump 22 or similar contrivance, the shavings are blown out.

The operation of this blowing device is as follows:

When the machine is running the guiding member 19 carrying the drilling device 9 is moved up and down. Attached to the lower part of the drilling device 9 are two guide bushes 23 which guide the casing 21 and which are continually pressed down by springs 24 and thus hold the hollow bodies 1. The shavings produced by the drill 25 drop into the casing 21 and are thence removed by an air current.

The filling device is provided with a container 26 for the reception of material to be filled into the hollow bodies, the material being pressed into the conduit 28 by means of a piston pump 27 in the usual manner. From the conduit 28 the material is fed in uniform quantities into a nozzle 29 which is controlled by a cone valve 40. The cone valve 40 is rotated by a bell crank lever 31 having a roll 32 on one end and is normally held in closed position by a spring 33.

To prevent dripping of the liquid filling material when the machine is stopped the following device is used. A rod 35 adapted to be moved up and down is connected by means of shaft 34 of the disc 4, lever 36 and member 36ª with the shaft of the belt shifting device. When handle 34ª is moved to shift the drive belt to stop the machine the rod 35 will be raised. Attached to the upper end of rod 35 are two levers 37 and 38. When lever 37 is pushed upward by rod 35 it strikes screw 39 and thus moves lever 31 in such a direction that the cone valve 40, which has a toothed wheel on one end engaged by a gear segment on lever 31, is moved and held in closed position.

The piston rod 41 is adjustably attached to the arm 18 of the device 11 by means of the screws 42. The piston rod 41 acts at its lower end as piston 43 and is arranged so as to be slightly elastic. The sealing material is kept in the known manner in a heated receptacle 45 having a bottom opening 46 as outlet for the material. The guiding member 19 is moved up and down by the lever system 47 and the cam 48. As the piston 43 must slightly touch the hollow body 1 to obtain a good sealing, it frequently happened that hollow bodies of different height remained either unsealed or were crushed by the piston. These drawbacks have been overcome by the following arrangement. In the piston rod 41 is arranged another slightly elastic piston 43 which is continually pressed down by the spring 49. The up and down movement of the piston 43 is limited by a stop 50. By the arrangement of this slightly elastic piston 43 differences in height of hollow bodies are equalized. The piston rod 41 and the slightly elastic piston 43 are warmed by the tempered mass 44, whereby the thorough connection of the sealing material with the hollow body is considerably accelerated as the piston 43 rests for a short time on the hollow body 1. It is further prevented as the piston slightly taps the hollow body that the air that may be contained in the hollow body can escape and sinking of the sealing material is avoided.

To prevent any dripping of the sealing material, the pipe 51 is pressed down by the lever 38, which is in connection with the disengaging rod 35, and thus closes the outlet 46.

To increase the output of the machine, the filled and sealed bodies are lifted out of the moulds at the discharge station 13 by means of an automatic gripping device as shown in Fig. 11 and deposited on a cooler conveyor 52.

The gripping device operates as follows:

Secured to the double arm 53 are the two grippers 54 and 55 which are raised, turned and lowered by means of the shaft 56, so that at each forward movement of the disc 4 carrying the holders 2 one hollow body 1 is gripped and another one deposited on the conveyor 52. The latter is intermittently moved forward by means of a ratchet wheel 57. The grippers are turned by the toothed wheel 58 which engages the teeth of disc 4, while the raising and lowering of the grippers are controlled by a cam disc 59 and lever system 60.

The gripper operates as follows:

The body of the gripper 61, as shown in Figs. 9 and 10, is provided with two arms 62 which are rotatably placed around the screws 63. The arms are constantly pressed together by the spring 64, and are controlled by the bolt 65 which is attached to the piston 66 which is under spring pressure. The arms 62 open during the downward movement of the grippers when the two bolts 67 are pushed against a wedge 68 whereby the hollow body is released. While the wedge 68 has caused the arms to separate bolt 65 is pressed down by the spring 69 and causes the arms to remain spread when moving up. After the emptied gripper has moved again towards the holders 2 screw 70, which is attached to the spring piston 66, strikes slides 71 and pushes the bolt 66 with bolt 65 upward. Owing to the curved shape of the arms 62 the latter are released by the upward movement of the bolt 65 and pressed together again by the spring 64, so that the hollow body 1 is gripped.

The conveyor 52 carries also a rubber sponge prism 72 which causes the hollow bodies to be deposited in such a way that the drop is always on top until they are perfectly cooled off.

The general operation is as follows:

The machine is driven as already described. By means of device 8 the disc 4 is intermittently turned forward step by step in such a manner that always one holder 2 holding one body 1 moves under the drilling, filling and sealing device. In this moment the cam 48 actuates the lever system 47 so as to cause a downward movement of the guiding member 19. This causes the drilling machine 9 to move downward and operate upon the article under it. At the same time the filling device 10 on arm 17 moves downward. The nozzle 29 enters the previously drilled hollow body while, simultaneously, the cranked lever 31 with its roll 32 strikes the disc 4 and, contrary to spring action, opens the closing organ, so that the material used for filling and pressed through conduit 28 can get out and enter the hollow body. When the guiding member moves upward again the closing organ is closed again by means of the spring 33. At the same time, owing to the previous upward movement, the piston 43 has released opening 46, so that the sealing material can enter it. During the downward movement of the guiding member 19 the piston 43 presses this sealing material out of the opening 46 and on the drilled hole of the hollow body 1, so that the latter is closed while the receptacle 45 remains stationary.

In this manner one hollow body is always drilled while, simultaneously, a second one is filled and a third one closed. The device may be provided with special regulating contrivances and also with several drilling machines, filling and sealing devices.

I claim:

In a device for making filled confections, the combination of an intermittently movable conveyor, holders adapted to receive hollow confection bodies equidistantly spaced on the conveyor, a guiding member mounted adjacent the conveyor and reciprocable toward and from said conveyor, confection drilling, filling and sealing devices mounted on said guiding member in spaced relation corresponding to the spaces between said holders, and in such a position that they can act on confections carried by the holders when the guiding member is reciprocated toward said conveyor, means for intermittently moving said conveyor step by step with a rest between each step and means for reciprocating said guiding member toward and from said conveyor so that as said conveyor is at rest the guiding member is moved toward the conveyor whereby three hollow bodies in three successive holders may be drilled, filled and sealed at the same time.

In testimony whereof I have affixed my signature.

RICHARD SIEGERT.